United States Patent [19]

Mannato

[11] Patent Number: 5,188,475

[45] Date of Patent: Feb. 23, 1993

[54] CONNECTOR FOR HANDLES AND SHOULDER BELTS OF BAGS, LADIES HANDBAGS, SUITCASES OR OTHER TRAVELING CONTAINERS

[75] Inventor: Pietro Mannato, Bologna, Italy

[73] Assignee: Finduck S.r.L., Bologna, Italy

[21] Appl. No.: 668,985

[22] Filed: Mar. 12, 1991

[30] Foreign Application Priority Data

Mar. 16, 1990 [IT] Italy .................................. 4772/90

[51] Int. Cl.⁵ .............................. F16D 3/00; A44C 5/18
[52] U.S. Cl. .......................................... 403/58; 403/74; 24/265 B
[58] Field of Search ................ 403/57, 58, 53, 74, 403/113, 150, 328; 24/265 B, 265 WS

[56] References Cited

U.S. PATENT DOCUMENTS

| | | | |
|---|---|---|---|
| 2,940,800 | 6/1960 | Knapp | 403/58 |
| 3,123,882 | 3/1964 | Meyerson | 24/265 B |
| 3,850,533 | 11/1974 | Thielen | 403/58 |
| 4,561,797 | 12/1985 | Aldridge | 403/58 |
| 4,597,138 | 7/1986 | Hirsch | 24/265 B |

FOREIGN PATENT DOCUMENTS 2637469 4/1990 France .................... 24/265 B

Primary Examiner—Peter M. Cuomo
Attorney, Agent, or Firm—Larson and Taylor

[57] ABSTRACT

A connector for handles and shoulder belts of bags, or other traveling containers, includes a base member (1) provided with holes (2) or other mechanism for securing it to the bag. Provided at the ends of the base member, on the exposed face, are equal and parallel protrusions (101) provided with respective transverse holes (5) aligned with each other and having pivoted thereon, by use of a spindle (4) or any other suitable device, a body member (3) which may effect a 180° oscillation about the spindle and which—when disposed upright and abutted against the base member—exposes a recess also directed upwards (7). The flattened end portion of an axially hollow stem (8) is pivotably connected by use of a screw (10) or any other suitable device, orthogonally to the pivotal spindle (4) of the member so that it can effect an oscillation of sufficient amplitude, the end portion of the handle or shoulder-belt (M-T) being secured by means of a screw or any other suitable device within the hollow stem.

6 Claims, 2 Drawing Sheets

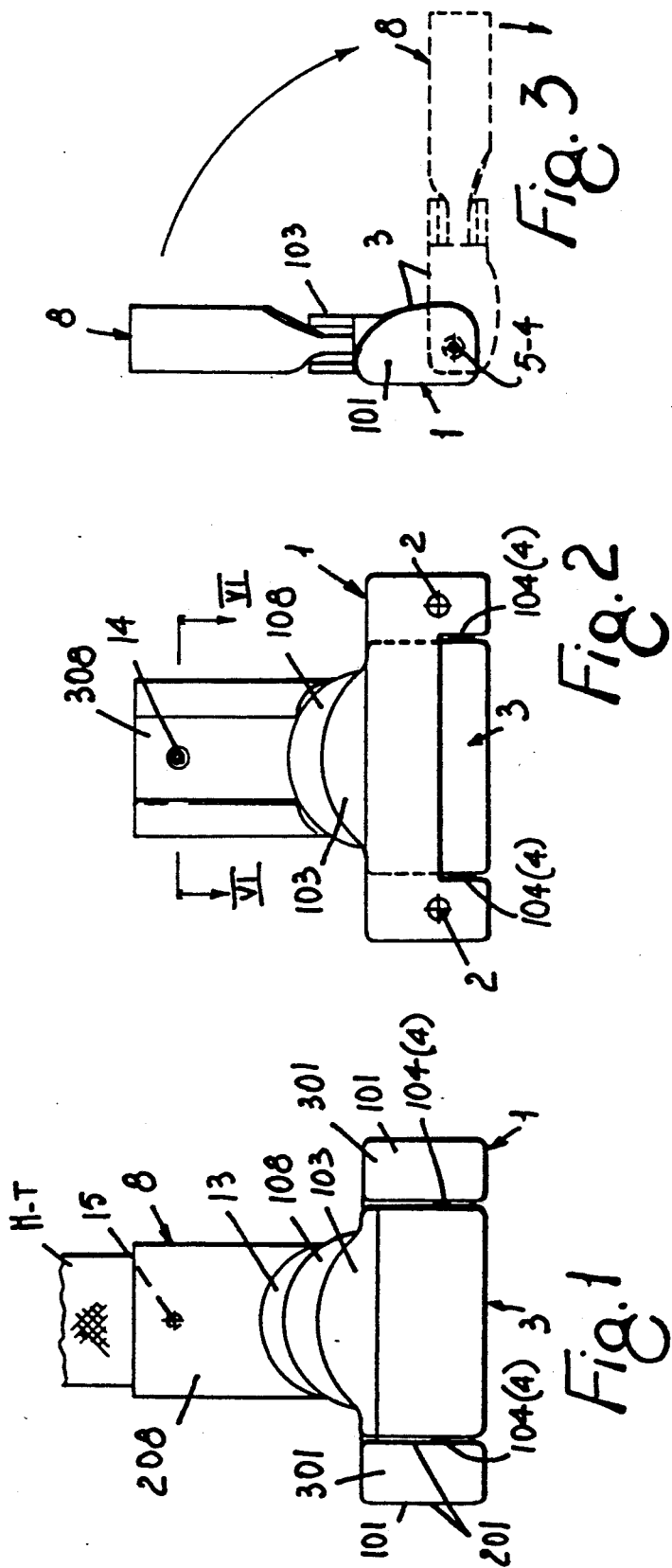

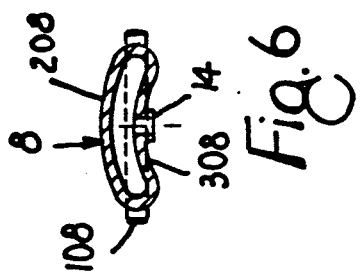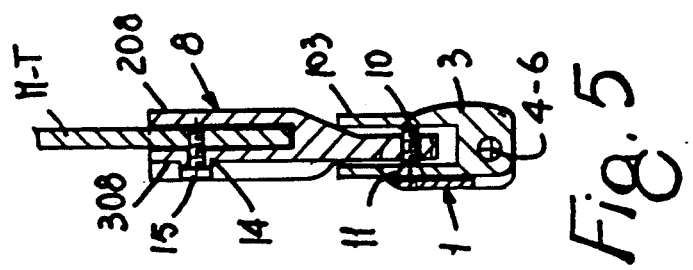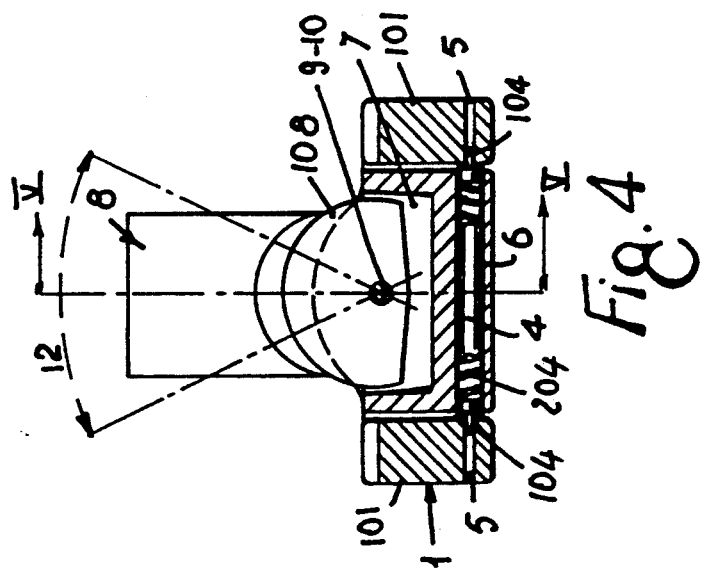

CONNECTOR FOR HANDLES AND SHOULDER BELTS OF BAGS, LADIES HANDBAGS, SUITCASES OR OTHER TRAVELING CONTAINERS

SUMMARY OF THE INVENTION

The invention relates to a connector for handles and shoulder belts of bags, or other traveling containers, characterized by a double articulation about orthogonal axes.

The connector according to the invention is characterized in that it comprises a base member provided with holes or other means for securing it to the bag and provided at the ends thereof, on the exposed face, with equal and parallel protrusions provided with respective transverse holes aligned with each other and having pivoted thereon, by means of a spindle or any other suitable means, a body member which may effect a 180° oscillation about said spindle and which—when disposed upright and abutted against said base member—exposes a recess also directed upwards. The flattened end portion of an axially hollow stem is pivotably connected by means of a screw or any other suitable means, orthogonally to the pivotal spindle of said body member so that it can effect an oscillation of sufficient amplitude, the end portion of the handle or shoulder-belt being secured by means of a screw or any other suitable means within said hollow stem.

BRIEF DESCRIPTION OF THE DRAWINGS

The characteristics of the connector of the invention, and the advantages resulting therefrom will become apparent from the following description made with reference to the Figures of the accompanying drawings, wherein:

FIGS. 1, 2 and 3 are front, back and side elevational views, respectively, of the connector;

FIG. 4 is an elevational and partly sectional view, on the line IV—IV of FIG. 3, of the connector;

FIG. 5 is a sectional view on the line V—V of FIG. 4, showing further details of the connector;

FIG. 6 is a sectional view on the line VI—VI of FIG. 2, showing further details of the connector.

DESCRIPTION OF THE PREFERRED EMBODIMENT

From the Figures, it will be appreciated that the connector comprises a base member 1 having an inverted U-shape, provided in its rear side with threaded blind holes 2 for securing it to a bag by means of screws, and provided at the ends of its exposed face with parallel equal protrusions 101 which, in side view, have an outline which is similar to the cross mid-section outline of an orange division (FIG. 3). The side faces 201 of the protrusions 101 are parallel to each other and perpendicular to the base member 1. The generatrix of the surface 301 of the protrusions 101 is rectilinear and perpendicular to the faces 201.

Arranged between the protrusions 101 is a body member 3 which is pivoted on a spindle 4 which is perpendicular to said protrusions. More particularly (FIG. 4), the protrusions 101 are provided with equal through-holes 5 in line with each other and with a hole 6 of larger diameter in the body member 3. Rotatably received in this hole is a spindle 4 of the type which is used to connect a strap to the body of a watch. In fact, the spindle 4 is provided with end projecting pins 104 which become engaged in the holes 5 and which comprise, each, a head slidably engaged in said tubular spindle 4 against the action of a spring 204.

The body member 3 can effect a 180° oscillation about the spindle 4. When the body member 3 is in the position abutting against the base member 1, its outline is flush with the outline of the protrusions 101 wherefrom said body member protrudes with a flattened end portion 103 which in front view as in the FIGS. 1, 2 and 4, has a rounded convex outline whose center is on the centerline of the body member 3. The portion 103 is provided with a blind recess 7 (FIG. 4) wherein the flattened and substantially semi-circular end portion 108 of a stem 8 is loosely engaged. The end portion 108 is provided with a central threaded hole 9 having screwed therein a screw 10 which is passed through a hole 11 formed in the wall of the body member 3 that abuts against the base member 1. The screw 10 has a planar head so as to be flush with the hole 11 and is of such a size as to be firmly secured to the end portion 108 while permitting the latter to be oscillated freely about the screw 10 with an amplitude 12 such as that shown in FIG. 4.

The stem 8 has a width which is smaller than that of the end portion 108, has a hollow formation axially therein and has a much flattened kidney shape. When the body member 3 is abutted against the base member 1, the stem 8 shows to the view its convex portion 208 which joins the end portions 108 via a suitable merging surface 13. Provided centrally on the concave portion 308 of the stem 8 is a thickened area 14 with a threaded hole wherein a screw or a dowel 15 may be screwed to secure within said stem the end portion inserted thereinto of the handle or shoulder-belt M-T of the bag.

It is to be understood that all minor modifications achieving the same utility and exploiting the same inventive principle may be made to the latch as described above. Some possible modifications may relate to the spindle 4 which, for example, might be replaced by a plain spindle with riveted end portions within the holes 5 which, for this purpose, are of stepped configuration to accommodate such end portions of the spindle.

I claim:

1. A connector for a carrying member of a traveling container comprising:

a base member having an exposed face with lateral ends, a engaging face opposite to said exposed face, a respective protrusion extending orthogonally away from said exposed face at each respective said lateral end of said exposed face, and a tranverse hole in each said protrusion;

a securing means for securing said base member to the traveling container with said engaging face engaging the traveling container and hence said protrusions extending away from the traveling container;

a spindle having a longitudinal axis which said spindle is mounted between said lateral ends in said transverse holes thereof;

a body member which is mounted for 180° oscillation about said spindle, said body member including a distal end radially distant from said spindle in which said distal end a planar recess is provided with a central plane of said recess including the longitudinal axis of said spindle;

a stem having a hollow proximal end in which the carrying member is attached to said stem and a distal end which is flattened and which is received in said recess of said body member; and a mounting means for pivotally mounting said distal end of said stem in said distal end of said body member such that said stem and hence said carrying member are rotatable about an axis which is orthogonal to the central plane of said planar recess.

2. A connector as claimed in claim 1 wherein said base member includes a cutout between said protrusions adjacent said spindle such that said body member is free to move about said spindle in said cutout.

3. A connector as claimed in claim 2 wherein said distal end of said body member is flattened; and wherein said body member is pivotally engagable to an abutting position with said exposed face of said base member by rotation about said spindle and in this abutting position exhibits an outline formed by a convex curved wall centered about a longitudinal axis of said stem which merges with an outline of said protrusions.

4. A connector as claimed in claim 3 wherein said distal end of said stem is semi-circular shaped.

5. A connector as claimed in claim 4 wherein said proximal end of said stem is kidney shaped in lateral cross section forming in the abutting position a convex front side which is distal from said exposed face and a concave rear side opposite thereto, and further including an attaching means for attaching the carrying member to said concave rear side.

6. A connector as claimed in claim 5 wherein said spindle includes a central tube, a spring located in said central tube, a respective projecting pin at each end of said central tube having a head slidably captured in said central tube which said projecting pins are urged oppositely outward from said central tube by said spring such that said projecting pins are movably engaged in respective said transverse holes of said protrusions.

* * * * *